No. 770,339.       Patented September 20, 1904.

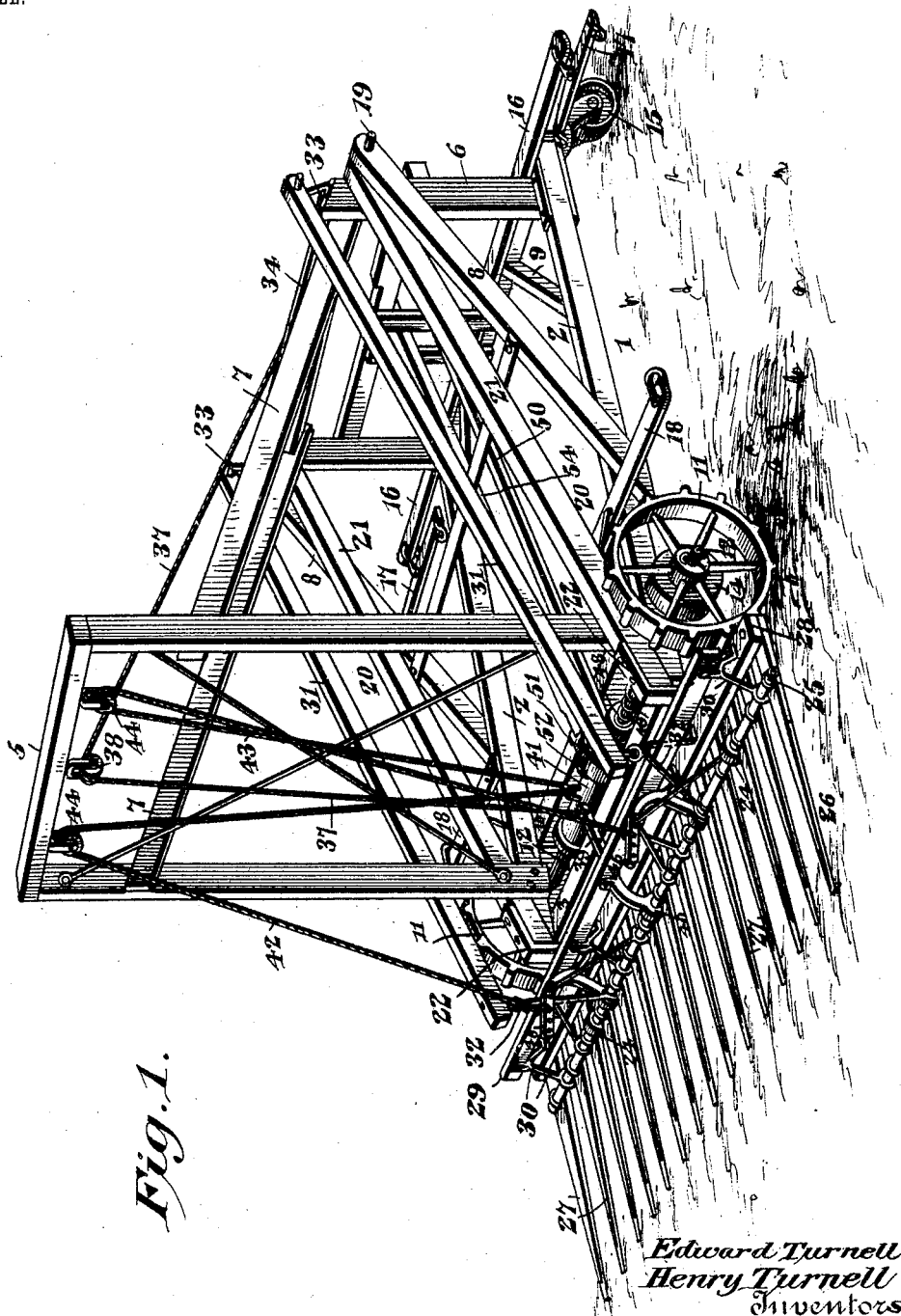

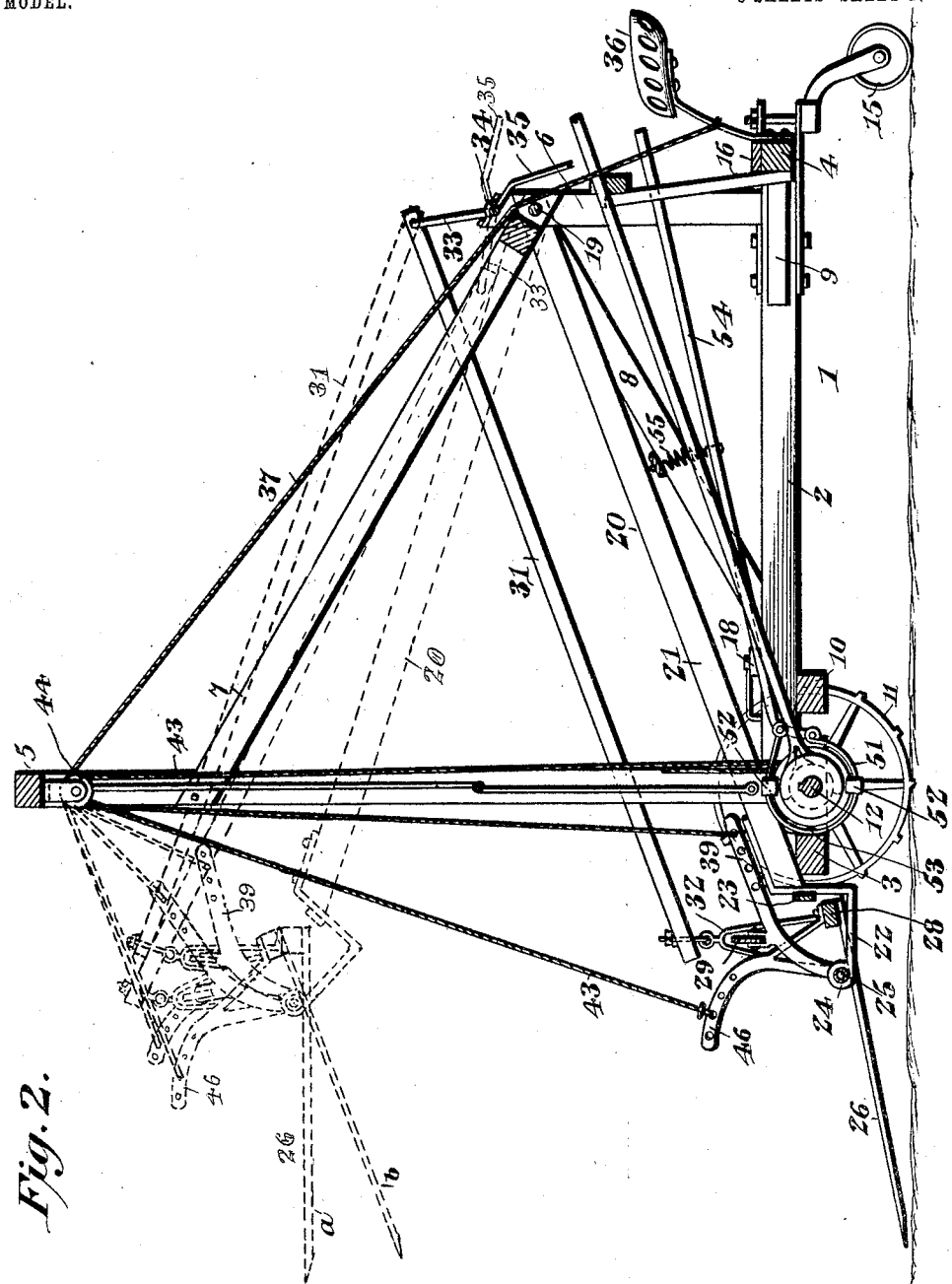

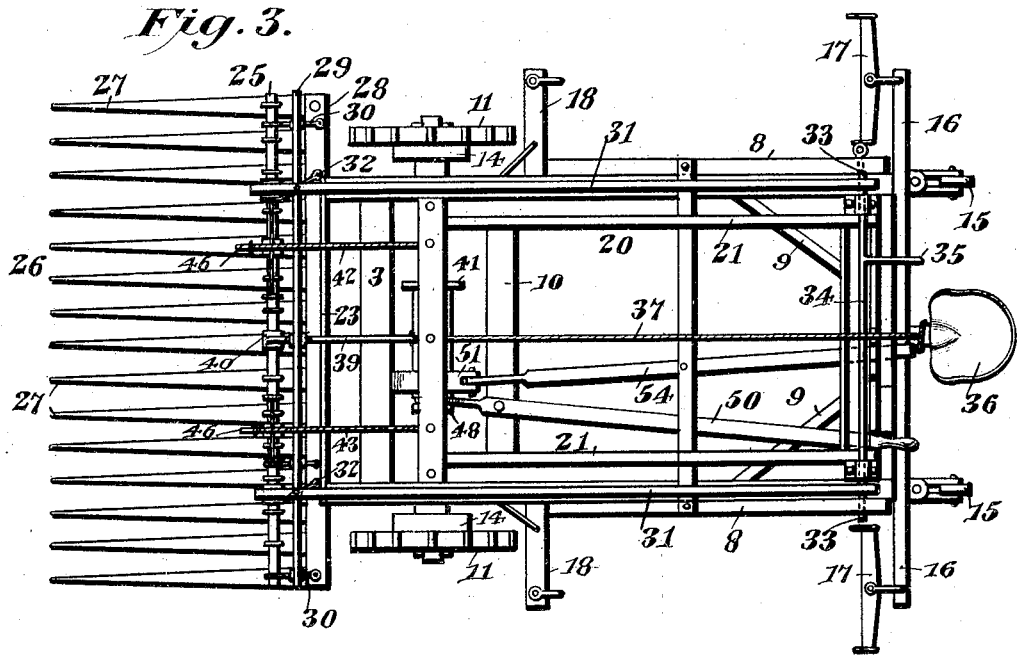
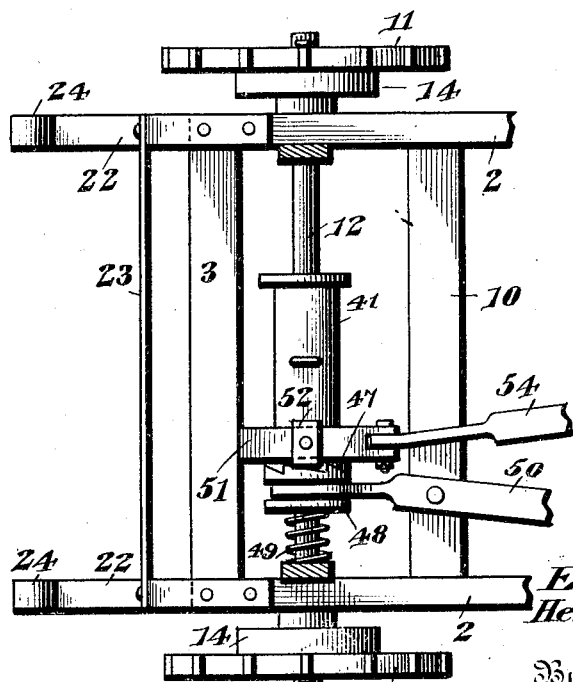
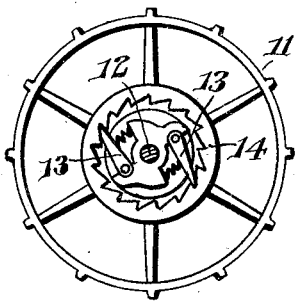

UNITED STATES PATENT OFFICE.

EDWARD TURNELL AND HENRY TURNELL, OF ELMCREEK, NEBRASKA.

HAY-STACKER.

SPECIFICATION forming part of Letters Patent No. 770,339, dated September 20, 1904.

Application filed December 11, 1903. Serial No. 184,797. (No model.)

*To all whom it may concern:*

Be it known that we, EDWARD TURNELL and HENRY TURNELL, citizens of the United States, residing at Elmcreek, in the county of Buffalo and State of Nebraska, have invented a new and useful Hay-Stacker, of which the following is a specification.

This invention relates to a novel hay-stacker, the object of the invention being to produce a simple, durable, and highly efficient implement for gathering either loose or bound hay from the field and depositing the same upon the stack.

The implement comprehends in its organization the usual swinging fork-frame and a tiltable fork mounted thereon and designed to be raised and lowered by the frame, one object being to provide improved mechanism for operating the frame by the advance of the machine and to improve the mechanism whereby the fork is tilted to dump the load after the latter has been elevated to the desired height.

Another object of the invention is to provide novel means for maintaining the proper horizontal position of the fork during its elevation to prevent the accidental discharge of the load of hay.

Other objects of the invention and various novel structural features will appear during the course of the succeeding description of the machine illustrated in the accompanying drawings and embraced within the scope of the appended claims.

In the said drawings, Figure 1 is a perspective view of our stacker complete, the fork being shown in depressed position. Fig. 2 is a vertical longitudinal section of the machine, the elevated and dumped positions of the fork being indicated in dotted lines. Fig. 3 is a plan view of the complete machine. Fig. 4 is a sectional plan view of a portion of the structure designed with special reference to the illustration of the fork-elevating drum, the clutch therefor, and the brake; and Fig. 5 is a detail view of one of the carrying-wheels, showing the rigid connection between the wheel and its shaft.

Like characters of reference designate corresponding parts in the several views.

The frame of the machine (designated as a whole by the numeral 1) is composed of an open rectangular base comprising side bars 2 and front and rear end bars 3 and 4, front and rear arches 5 and 6, rising from the opposite ends of the base, and inclined upper and lower braces 7 and 8, the former extending between the upper ends of the arches and the latter extending from the upper end of the rear arch to points adjacent to the front end of the base 2. If desired, the base of the frame may be further braced by corner-braces 9 at its rear end and by a transverse bar 10 adjacent to its front end and parallel with the bar 3. (See Figs. 2 and 3.) The light but rigid frame thus constructed is equipped at its front end with carrying-wheels 11, loosely mounted on a shaft 12, suitably journaled in the frame, as shown, and provided with pawls 13, arranged to be engaged by the teeth of ratchet-hubs 14, secured to the carrying-wheels, as shown in Fig. 5. The pawl-and-ratchet connection between the wheels and the shaft is designed to compel the rotation of the shaft with the wheels when the machine is advanced over the ground and to permit independent movement of the wheels when the machine is drawn back or relatively different movement of the two wheels when making a turn.

The rear end of the machine is supported by caster-wheels 15, mounted to swing in a manner well understood in the art to accommodate changes in direction.

The draft-animals are designed to walk at opposite sides of the machine, and a draft-bar 16 is therefore extended across the rear end of the frame for the attachment of swingle-trees 17, neck-yokes 18 being extended in opposite directions from the frame immediately in rear of the carrying-wheels 11. (See Fig. 2.)

At the upper end of the rear arch 6 is disposed a transverse shaft 19, from which is swung the fork-frame 20, comprising side bars 21, extending beyond the frame and equipped at their front ends with angular brackets 22, connected by a transverse bar 23, which insures the necessary rigidity of the frame 20. The front ends of the brackets 22 are provided with bearing-eyes 24 for the reception of the shaft 25 of the tiltable hay-fork 26. The fork 26 comprises a series of teeth or tines 27, connected at their rear ends to a bar 28, located some distance in rear of the shaft 25. In order to prevent the hay accumulated on the fork from moving back to the machine-frame, said fork is provided with an elevated guard or back 29, supported by brackets 30, secured to the bar 28 and to the shaft 25, respectively. (See Fig. 1.) The fork is thus tiltably mounted with the shaft 25 as its axis. It is evident, however, that the fork should be prevented from tilting prematurely, and we have therefore devised means which not only prevent the accidental dumping of the hay, but which maintain the fork in its substantially horizontal position during its elevation, notwithstanding the fact that the fork-elevating frame 20 swings from the inclined position shown in full lines in Fig. 2 to the reversely-inclined position indicated in dotted lines in said figure. The illustrated embodiment of this means includes a pair of fork-tilting bars 31, pivotally connected at their front ends to guard members or brackets 32, rising from the rear end of the fork, and likewise pivotally secured at their rear ends to cranks 33 of a crank-shaft 34, journaled in suitable bearings at the upper end of the rear frame-arch 6 and provided with an operating-handle 35, disposed within convenient reach of the driver or other operator, for whose accommodation a driver's seat 36 is supported at the rear end of the machine-frame. (See Fig. 2.) Normally the parts assume the positions indicated in full lines in Fig. 2. The front ends of the bars 21 rest upon the frame-bar 3. The fork 26 is disposed adjacent to the ground, and the fork-tilting bars 31 are disposed parallel with the bars 21 of the fork-frame. As the distance between the axis of the fork and the pivotal connection at the front ends of the bars 31 is substantially the same as the distance between the axis of the swinging frame 20 and the pivotal connection at the rear ends of the bars 31, it follows that as the frame 20 is swung up to the position indicated in dotted lines in Fig. 2 the substantially horizontal position of the fork will be maintained, since the relative positions of the fork and its elevating-frame will be constantly changed in accordance with the change of relation of the axis of the fork and its pivotal connection with the front ends of the bars 31. When, however, the fork reaches its elevated position, it is simply necessary for the operator to pull back the handle 35 of the crank-shaft, thus swinging the cranks 33 forward and advancing the tilting-bars 31 to effect the swinging or tilting of the fork to the position b from the position a, (indicated in Fig. 1,) to dump the hay upon the stack. It will thus be seen that the dumping means includes a pair of members—to wit, a bar 31 and a crank 33—which are pivotally connected to each other at their proximate or adjacent ends and have their remote ends pivotally connected with the main frame and fork, respectively—that is to say, the rear end of the crank considered as a member is pivotally connected with the main frame, inasmuch as it swings from the crank-shaft as an axis, while the front end of the other member—to wit, the tilting-bar 31—has pivotal connection with the fork. It will of course be understood that there is sufficient friction in the bearings of the shaft 34 to prevent the cranks 33 from being swung while the fork is being elevated; but means for positively retaining the shaft might be employed, if desired. We also provide the fork with a dumping-cable 37, passed over a pulley 38 at the top of the front arch 5 and connected to a dumping-lever 39, (see Fig. 2,) extended rearwardly from the fork and preferably connected to the back or guard 29, as shown in Fig. 2, and also having a terminal eye 40 for the reception of the shaft 25. Obviously a pull on the cable 37 will elevate the lever 39, and thus swing down or dump the fork.

Having now described the manner in which the fork is mounted, maintained in horizontal position during its elevation, and dumped when it has reached the proper point, we will now proceed to describe the means whereby the frame 20 is swung up for the purpose of raising the fork to effect the elevation of the hay from the ground to the top of the stack.

The fork-elevating mechanism includes a drum 41, loosely mounted on the wheel-shaft 12 and having connected to the periphery thereof a pair of elevating-cables 42 and 43, passed over pulleys 44 at the top of the front arch 5 and having their front ends connected to brackets 46, rising from the rear ends of the fork, but extended in advance of the axis thereof for the attachment of the cables. The drum 41 is designed to be rotated by the carrying-wheels 11 as the machine is advanced over the ground. This object is attained by providing one end of the drum with a clutch-face 47, designed to be engaged by a clutch-collar 48, splined upon the shaft 12 and urged to its engaging position by a spring 49, as shown in Fig. 4. When the clutch 48 is in engagement, the advance of the machine will cause the rotation of the wheels 11, which will in turn rotate the shaft 12, and the clutch splined thereon will rotate the drum to wind the cables 41 and 42 thereon, and thus effect the elevation of the fork. It is designed, however, to have the machine gather the hay from the field, as well as to stack it, and in order to do this the fork must remain in its depressed position while the machine is advanced. We therefore attach to the clutch 48 a clutch-lever 50, preferably pivoted to the bar 10 and extended to the rear end of the frame (see Fig. 3) to be swung by the driver for the purpose of withdrawing the clutch from the drum, and thus preventing the operation of the latter and the elevation of the fork as the machine is advanced to gather the hay. When a load of hay has been accumulated on the fork and the machine advanced to a point adjacent to the stack, the lever is released to permit the engagement of the clutch with the drum, and by the time the machine has reached the stack the rotation of the drum will have effected the elevation of the fork, and the latter may be tilted in the manner described to dump the hay on the stack. As the machine will be stationary during the dumping of the hay, the connection between the drum and the shaft 12 will prevent the rotation of the drum to permit the unwinding of the elevating-cables 42 and 43, and the fork will therefore remain in its elevated position until the operator again swings the lever 50 to withdraw the clutch 48. As soon as this is done the fork will drop down to its normal position for the reception of another load. As the fork and its frame are of considerable weight, the sudden dropping thereof might effect the derangement of the parts. In order to avoid this possibility, the drum is encircled at one end by a brake-band 51, equipped with brake-shoes 52 and fixed at a point intermediate of its ends to the bar 3, as indicated at 53. One end of the brake-band 51 is secured to the extremity of an angular brake-lever 54, to which at a point in rear of its extremity the other end of the band 51 is attached. The lever 54 is retained in one position by a spring 55, and when it is desired to retard the reverse rotation of the drum for the purpose of easing the drop of the fork the rear end of the brake-lever, which is located in proximity to the driver's seat, is swung down, thus causing the ends of the brake-bands to be drawn in opposite directions for the purpose of urging the brake-shoes 52 into frictional engagement with the drum in an obvious manner.

Since the operation of the various mechanisms included in the machine has been explained during the course of this description, reiteration is deemed unnecessary.

It is thought that from the foregoing the construction, operation, and many advantages of our improved stacker will be apparent to those skilled in the art; but while the present embodiment of the invention appears at this time to be preferable we desire to reserve the right to effect such changes, modifications, and variations of the illustrated structure as may fall fairly within the scope of the protection prayed.

What we claim is—

1. In a hay-stacker, the combination with a main frame; of a swinging fork-frame, a fork tiltably mounted thereon, means for maintaining the fork in a substantially horizontal position during its elevation, said means including a pair of swinging bars having pivotal connection with the fork, and means mounted on the main frame for moving said bars longitudinally to effect the positive dumping of the fork after the latter has been elevated.

2. In a hay-stacker, the combination with a frame, of a fork-frame swung from its rear end, a fork tiltably carried by the fork-frame, a crank-shaft mounted on the rear end of the stacker-frame, and a rod connected at its rear end to the crank-shaft and having pivotal connection at its front end with the fork whereby the rotation of the shaft will effect the positive dumping of the fork after the latter has been raised.

3. In a hay-stacker, the combination with the main frame, a swinging fork-frame, and a fork tiltably mounted on the latter; of a crank-shaft mounted on the rear end of the main frame, brackets carried by the fork in rear of its axis, a pair of bars connected at their front ends to the brackets and at their rear ends to the cranks of the crank-shaft and disposed substantially parallel with the fork-frame, means for preventing rotation of the crank-shaft during the elevation of the fork and means for rotating the crank-shaft to effect the positive tilting of the fork for the purpose of dumping the hay.

4. In a hay-stacker, the combination with a frame comprising an open base, front and rear arches, and connecting-braces; of a fork-frame swung from the upper end of the rear arch and normally resting at its front end upon the front end of the open base, means located at the lower end of the front arch for elevating the fork-frame, and means mounted on the stacker-frame for positively dumping the fork.

5. In a hay-stacker, the combination with the stacker-frame, a swinging fork-frame, and a fork tiltably mounted at one end of the latter, and a crank-shaft provided with a crank at each end thereof and with an operating-handle, and a pair of rods connected at their rear ends to said cranks and having pivotal connection at their front ends to the fork at points adjacent to the opposite ends of the latter.

6. In a hay-stacker, the combination with a stacker-frame comprising an open base and front and rear arches and connecting-braces, of a fork-frame comprising connected side bars swung from the upper end of the rear arch, a fork tiltably carried by the fork-frame in advance of the front arch, a crank-shaft mounted at the top of the rear arch of the stacker-frame, a guard rising from the rear edge of the fork, a bar having connection at its rear end with the crank of the crank-shaft and means operatively connecting the front end of the bar with the fork.

7. In a hay-stacker, the combination with a stacker-frame comprising an open base, front and rear arches and connecting-braces, of a driver's seat mounted in rear of the frame, a fork-frame swung from the rear arch, a tiltable fork mounted at the front end of the fork-frame and provided with an elevated guard, a crank-shaft journaled upon the upper end of the rear arch and provided with terminal cranks and with a handle, the latter being disposed in convenient proximity to the driver's seat, a pair of rods connected at their rear ends to the terminal cranks of the crank-shaft and means for effecting an operative connection between the fork and the front ends of said rods.

8. In a hay-stacker, the combination with a stacker-frame comprising an open base, front and rear arches and connecting-braces, of carrying-wheels for said frame, a fork-frame swung from the rear arch, a fork tiltably mounted at the front end of the fork-frame and provided with an elevated guard, a pair of brackets disposed in advance of the guard, a dumping-arm extending rearwardly from the guard, a drum mounted at the lower end of the front arch, means for operatively connecting the drum with the carrying-wheels, pulleys at the top of the front arch, cables connected to the brackets and to the dumping-arm and passed over said pulleys, the cables connected to the brackets being secured to the drum and the cable which is connected with the dumping-arm being carried back to the rear end of the machine, the rotation of the drum serving to effect the elevation of the fork-frame and a pull upon the dumping-cable serving to positively swing the fork to dump the hay.

9. In a hay-stacker, the combination with a main frame, a swinging fork-frame, and a fork tiltably mounted on the latter, of means for elevating the fork, and means for positively dumping said fork, said dumping means including pivotally-connected members one of which is mounted to swing from the main frame and the other of which is pivotally connected to the fork at a point eccentric to the axis thereof.

10. In a hay-stacker, the combination with a main frame, a swinging fork-frame, and a fork pivotally mounted on the latter, of means for elevating the fork, and means for positively dumping the fork, said dumping means including a pair of members connected at their proximate ends and having pivotal connection at their remote ends with the main frame and fork respectively.

In testimony that we claim the foregoing as our own we have hereto affixed our signatures in the presence of two witnesses.

EDWARD TURNELL.
HENRY TURNELL.

Witnesses:
J. W. LUCKER,
J. H. GRIFFITH.